March 30, 1937.  R. P. LEWIS  2,075,211
AUTOMATIC CLUTCH MECHANISM
Filed Sept. 2, 1933
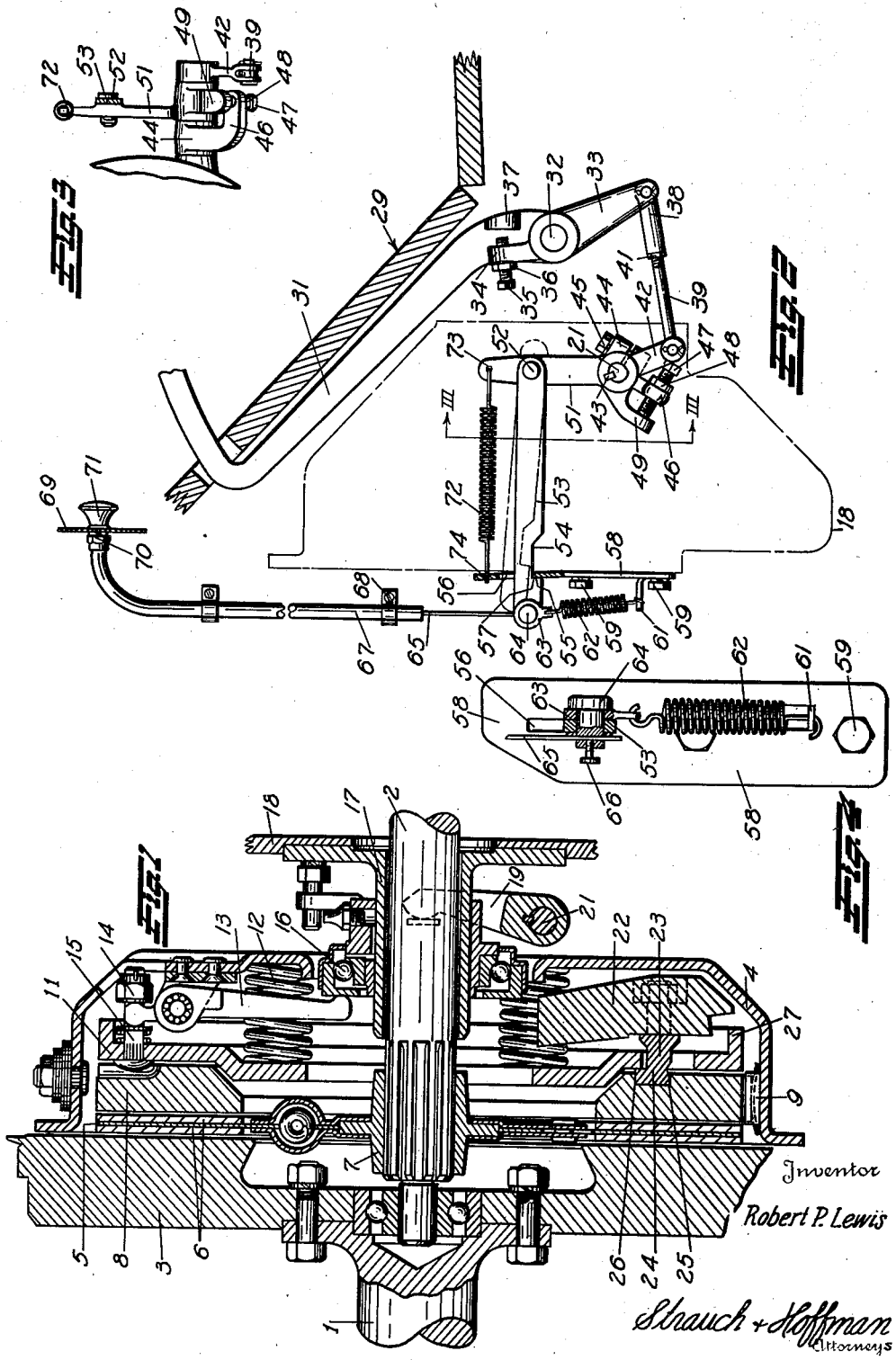
Inventor
Robert P. Lewis
Strauch + Hoffman
Attorneys Patented Mar. 30, 1937

2,075,211

UNITED STATES PATENT OFFICE 2,075,211

AUTOMATIC CLUTCH MECHANISM

Robert P. Lewis, Toledo, Ohio, assignor to Automatic Drive and Transmission Company, Gloucester City, N. J., a corporation of New Jersey Application September 2, 1933, Serial No. 688,018

21 Claims. (Cl. 192—105)

The present invention relates to automatic mechanisms for transmitting power from a driving shaft to a driven shaft.

More particularly, the present invention is concerned with automatic or self-operating clutches, and more specifically it has to do with mechanisms for controlling their operation.

In co-pending application, Serial Number 595,184, filed February 25, 1932, speed responsive clutches, having mechanism for causing them to be engaged or disengaged at any speed, irrespective of operation of the speed responsive mechanism, are disclosed, and the present invention aims to improve the mechanisms employed for this purpose, and to also devise a controlling mechanism which has other highly desirable features to be more particularly pointed out hereinafter.

It is a primary object of the present invention to devise novel mechanisms for controlling the operation of automatic clutches, which are efficient in operation and stand up well in use and yet which may be cheaply produced.

It is another major object of my invention to devise, for use in clutch mechanisms of the type wherein a clutch member is urged from an automatic position to an engaging position by resilient means, novel means for selectively holding the member in automatic position against the action of the resilient means.

Another object of my invention resides in the provision, in an automatic clutch of the character having a speed-responsive mechanism for causing clutch engagement, and resilient means tending to cause clutch engagement, of novel means for controlling the action of the resilient means.

My invention further aims to devise, for use in automatic clutches of the character having means for selectively holding their parts in automatic position, novel means for adjusting the holding means in such manner that the location of the automatic position may be adjustably varied.

Another object of the present invention is to devise, for use in automatic clutches of the character having latch means for selectively holding the parts in automatic position, an adjustable one-way connection between the latch means and the clutch parts.

It is a further object of my invention to devise a novel latch mechanism adapted for use in friction clutches, which has a one-way connection between the clutch parts which it is adapted to latch, and which has means for moving its parts toward latching position when the clutch parts are moved toward latching position.

Further objects of the present invention will become apparent as the specification thereof proceeds in connection with the annexed drawing and from the appended claims.

In the drawing:

Figure 1 is a longitudinal sectional view of one form of automatic clutch with which my novel controlling mechanisms may be used.

Figure 2 illustrates the clutch shown in Figure 1 mounted in a motor vehicle, and having my novel controlling mechanism associated therewith.

Figure 3 is a view with parts in section, taken substantially on the line III—III of Figure 2.

Figure 4 is an end view of the mechanism shown in Figure 2 and illustrates the parts as they appear when viewed from the left-hand side of that figure.

With continued reference to the drawing, wherein like reference characters are employed to designate like parts throughout the several views thereof, I have illustrated the automatic clutch mechanism shown in my copending application Serial Number 676,567, filed June 19, 1933, which may be referred to for a more detailed disclosure thereof.

Briefly, the automatic clutch is constructed and operates as follows: Driving and driven shafts 1 and 2 respectively, are mounted for rotation in any suitable manner and the driving shaft carries a flywheel 3 which has a cover 4 secured thereto. A driven disc 5, having facings 6 secured thereto, is carried by a hub 7 splined to shaft 2 and cooperates with a face of flywheel 3 and with an automatic plate 8, which is mounted for synchronous rotation with the driving shaft 1 and flywheel 3 by means of driving lugs 9 which are secured to cover 4 and seat in recesses in the automatic plate. A reaction plate 11 is mounted for rotation with, and is urged toward the automatic plate by means of hold-back spring assemblies (not shown), and the automatic and reaction plate assembly is urged toward the flywheel by means of compression springs 12 which are interposed between cover 4 and plate 11.

Movement of the automatic and reaction plate assembly under the influence of springs 12 is adapted to be controlled by means of levers 13 journalled on cover 4 and which act against nut and washer assemblies 14 carried by bolts 15 secured to plate 11. The inner ends of levers 13 cooperate with a throwout assembly 16 which is mounted for axial movement on a supporting sleeve 17 secured to a housing 18. Throwout assembly 16 is actuated by means of a throwout fork 19 secured to a throwout shaft 21. In Figure 1, the throwout assembly is disposed in intermediate or automatic position, and it is maintained in this position against the action of springs 12, during certain phases of operation of the clutch by mechanism to be presently described.

Automatic plate 8 and reaction plate 11 are adapted to be forced away from each other in response to acceleration of the driving shaft, by means of a plurality of weights designated generally at 22. Weights 22 are carried by levers 23 which have laterally extending portions 24 disposed and clamped between plates 8 and 11 by means of the hold-back assemblies. Lateral portions 24 are provided on their outer sides with knife edges 25 which are adapted to fulcrum in the outer corners of recesses 26 formed in the automatic plate when the levers swing outwardly in response to centrifugal force.

With driving shaft 1 operating at idling or disengaging speed, and with the throwout mechanism disposed in the position shown in Figure 1, the plates are disengaged and shafts 1 and 2 are accordingly uncoupled. As shaft 1 is accelerated above idling speed, weights 22 rock outwardly about edges 25 as axes and force plates 8 and 11 away from each other and cause pressure to be built up in springs 12 and between the plates. This action forces reaction plate 11 to the right and thereby relieves levers 13 of the stress of springs 12. Torque of gradually increasing magnitude is thereby automatically transmitted from shaft 1 to shaft 2, and when shaft 1 attains a predetermined speed the plates are brought into non-slipping engagement by the action of the weights, and at a speed slightly in excess of this speed the weights move out into engagement with a flange 27 provided on plate 11 and they are thereby prevented from moving further outwardly and building up further pressure between the plates in response to further acceleration of the driving shaft. When the driving shaft is decelerated to idling speed the automatic and reaction plates are brought towards each other by the hold-back assemblies and the clutch is thereby disengaged.

When the clutch is automatically engaged in the manner just described, the plates may be disengaged by moving the throwout mechanism to the left, which, through levers 13 and bolts 15 moves reaction plate 11 and automatic plate 8 to the right, and thereby disengages the latter from the driven member.

When the parts are disposed in the positions shown in Figure 1, with the driving shaft operating at or below idling speed, the plates may be brought into driving engagement by allowing the throwout assembly to move to the right under the influence of springs 12. Movement of the throwout assembly to the right allows springs 12 to force plates 8 and 11 to the left and bring plate 8 into driving engagement with the driven member.

In Figure 2 of the drawing I have illustrated my novel controlling mechanism as being associated with the clutch mechanism shown in Figure 1, and in the particular instance the mechanism is shown as being installed in an automotive vehicle having the usual floor board assembly 29. A clutch pedal 31 is freely mounted for oscillation on a shaft 32 which is preferably supported by the frame or body of the vehicle (not shown), because in the present instance, the engine utilized with the mechanism is provided with a floating power mount, and by mounting the clutch pedal on a shaft which is supported independently of the engine, vibration of the latter will not result in corresponding movements of the clutch pedal. Also mounted for oscillation on shaft 32 is a lever 33 having an enlarged portion 34, provided thereon. A screw 35 is threaded into portion 34 of lever 33, and is adapted to be adjustably locked in position therein by means of a locknut 36, or the like. Screw 35 is adapted to cooperate with a boss 37 which is preferably integrally formed on clutch pedal 31. A sleeve-like link member 38 is pivotally connected to lever 33 and threadedly receives a complemental link member 39, which is held in adjusted position with respect thereto by means of a locknut 41 or the like, threaded on link member 39.

Pivotally secured to link member 39 is a lever 42, which is secured to shaft 21 by means of a key 43 or the like. Also secured to shaft 21 is a split lever 44 whose bifurcations are clamped about the shaft by means of a screw 45. Carried by a laterally extending arm 46 of lever 44, is a screw 47 which is adapted to be locked in adjusted position thereon by means of a locknut 48. Screw 47 cooperates with a finger 49 formed on a lever 51 which is mounted for free oscillation on shaft 21. Pivotally secured to lever 51, by means of a pin 52 or the like is a latch member 53, which is provided with a riding face 54 and a latching face 55. Member 53 extends through an aperture 56 located in, and cooperates with latching edge or portion 57 of a plate 58, which is preferably secured to the flywheel housing by means of cap screws 59. By reason of member 53 being slidably disposed in aperture 56 of plate 58, it may undergo longitudinal movement but is restrained against lateral or transverse movement. Plate 58 is provided with an apertured finger 61, to which a tension spring 62 is anchored. The upper end of spring 62 is secured to an apertured member 63 which is swivelled on a pin 64 carried by latch member 53, and tends to hold member 53 in contact with latch portion 57 at all times. An actuating wire 65 extends through an aperture in pin member 64, and is secured therein by means of a set screw 66 or the like. Wire 65 extends upwardly and is encased in a flexible housing member 67. Housing 67 terminates short of the latch assembly so that movement of member 53 will not kink wire 65 and it is adapted to be supported by a bracket 68 or the like which is secured to any suitable part of the vehicle (not shown). Housing 67 and wire 65 constitute the well known Bowden wire control, and the assembly is led up to a convenient operating location, which in the present instance is shown as the vehicle dash 69. The assembly is secured to dash 69 by means of nut 70, and wire 65 is provided with an actuating knob 71, which may be withdrawn to lift latch member 53 with its latching face 55 clear of portion 57 of plate 58.

A tension spring 72 has its ends hooked through apertures 73 and 74 in lever 51 and plate 58 respectively, and tends to urge latch member 53 to the left at all times. Although I prefer to use a spring of this character, it is to be understood, that if desired, springs of other known types may be employed without departing from the spirit of the present invention.

The parts are shown in Figure 2 as they appear when clutch pedal 31 is released and latch member 53 is locked against plate 58. When the parts are held in this position, the throwout mechanism assumes the position shown in Figure 1, and if the engine is operating at idling speed the plates will be disengaged as shown in this figure. The parts are normally held in this position when the clutch is being utilized as an automatic clutch, and it will accordingly be hereinafter termed "automatic position". The location of automatic position, or the idle release clearance existing between the plates under these conditions, may be accurately established by adjusting screws 35 and 47, and link 38 with respect to link 39, in a manner to be more distinctly pointed out hereinafter.

With the above described mechanism installed in a motor vehicle provided with a conventional, three-speed transmission, and the vehicle on a substantially level surface, the transmission may be placed in high gear without operating the clutch pedal if the engine is operating below the engaging speed of the clutch mechanism, and the parts are latched in automatic position, and the engine may be accelerated to produce automatic clutch engagement in the manner previously described. During the engaging operation, a slipping drive is provided between shafts 1 and 2 as previously explained and the vehicle is accelerated smoothly and without shock and in view of the speed responsive engaging characteristics of the mechanism, it is impossible to stall the engine through improper manipulation of the accelerator. When the engine and vehicle speeds are properly correlated, the clutch plates are brought into full driving engagement, thereby automatically establishing a direct coupling between shafts 1 and 2.

When operating with the clutch engaged, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 22 rock inwardly under the influence of the hold-back springs, and disengagement of the clutch plates is automatically effected. Shafts 1 and 2 are thereby automatically uncoupled and the braking action of the engine is no longer transmitted to shaft 2, but in view of the fact that the disengaging speed of the clutch mechanism is usually fairly low, the vehicle is decelerated to a relatively low speed under the braking influence of the engine before the mechanism automatically disconnects shafts 1 and 2.

The vehicle may be brought to a stop by continued application of the brakes or, if traffic conditions permit, the accelerator may be depressed and the engine accelerated to produce almost immediate re-engagement of the mechanism and the vehicle again picked up in high gear.

*Manual disengaging operation*

When the plates have been automatically brought into full driving engagement in the manner previously described, the clutch pedal may be depressed to displace the throwout bearing assembly and the inner ends of levers 13 to the left of the position in which they are shown in Figure 1, through the medium of boss 37 in picking up screw 35, lever 33, links 38 and 39, lever 42 and shaft 21. Movement of levers 13 in this manner causes them to fulcrum about and react against bolts 15 and withdraw the reaction plate from the flywheel. Withdrawal of the reaction plate produces withdrawal or disengagement of automatic plate 8 from the driven member because plates 8 and 11 are held in unitary relation by the hold-back assemblies. If the engine speed is maintained above the predetermined engaging speed during the manual declutching operation, weights 22 remain in their outermost positions, therefore, the declutching operation does not involve retracting the weights against the action of centrifugal force, which, at high speeds might be sufficiently high to preclude effecting the manual declutching operation. During the declutching operation screw 47 tends to be rocked out of contact with finger 49 of lever 51, but spring 72 causes lever 51 to follow up and move latch member 53 to the left with its face 54 riding in engagement with portion 57 of plate 58.

When the clutch pedal is released, face 55 of latch member 53 is again brought into engagement with portion 57 of plate 58 with the result that the parts are again latched in automatic position.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates (if the engine is operating above the engaging speed of the mechanism) in a manner similar to a manual clutch, for maneuvering the vehicle into and out of parking positions or for navigating in heavy traffic.

*Manual engaging operation*

As has been previously pointed out, when shaft 1 is operating substantially at the idling speed of the prime mover or is stationary and the clutch pedal is latched to dispose the throwout bearing in the automatic position shown in Figure 1, a clearance exists between the clutch plates, and shafts 1 and 2 are accordingly disconnected. When it is desired to establish a driving connection between shafts 1 and 2, under these conditions, knob 71 is pulled out which lifts latch member 53 against the action of spring 62, and brings its latch face clear of portion 57 of latch plate 58. This action allows springs 12 to force the plates into engagement, and acting through the throwout assembly, shaft 21, lever 44, screw 47 and lever 51, it brings latch member 53 into the dotted line position shown in Figure 2. If desired, sufficient friction may be introduced into the Bowden wire assembly to hold knob 71 in its withdrawn condition against the action of spring 62, but in the present instance spring 62 is preferably strong enough to restore the parts to latching position when knob 71 is released because it is usually only desired to effect the manual engagement operation momentarily.

With the above described mechanism installed in a motor vehicle, it is sometimes desirable to effect this manual engaging operation. For instance, when the motor is cold and the battery is low, it is desirable to place the transmission in gear and push or coast the vehicle to turn the engine over. Also when stopping on a steep grade, positive engagement of the clutch with the transmission placed in low or reverse gear provides an emergency brake that cannot be inadvertently released; or if the motor stalls from lack of fuel or any other cause, the vehicle can pull out of a dangerous situation by propelling it in low gear with the starting motor.

When the parts are disposed in the manually engaged position just described, screw 35 is disposed in close proximity to its boss 37 on pedal 31, and latch member 53 is held out of engagement with latch portion 57 of plate 58. When it is desired to restore the parts to latched or automatic position, pedal 31 is depressed, which picks up screw 35, and acting through lever 33, links 38 and 39, and lever 42, restores shaft 21 to the position shown in Figure 2. During movement of the parts in this manner, spring 72 brings latch member 53 to the left and spring 62 pulls it down into latching position, with face 55 thereof engaging latch portion 57 of plate 58, as seen in Figure 2.

As previously explained, the latch mechanism is adjusted to hold the parts in the position shown in Figures 1 and 2 when the prime mover is operating at idling speed or is stationary. When the facings have become thin as a result of particles thereof wearing away during operation and the idle release plate clearance becomes too great, the throwout bearing assembly is moved slightly to the right of the position in which it is shown in Figure 1 by loosening locknut 48 and unscrewing screw 47, which allows levers 42, 44 and 33 to move into positions located angularly clockwise with respect to those shown in Figure 2. This adjustment causes automatic plate 8 to be disposed closer to the flywheel and establish proper plate clearance for idle release conditions. This adjustment also has the effect of disposing screw 35 closer to its boss 37, and if the clearance between these plates is found to be too small when it is completed, screw 35 may be backed off to establish proper clearance. When facing wear has been compensated for several times by periodically adjusting the throwout bearing assembly further to the right, fingers or levers 13 may be allowed to move to the right to such an extent that under some conditions, they take undesirable angular positions. This condition is readily remedied or compensated for by adjusting nuts 14 an equal amount sufficient to bring levers 13 into the proper positions desired. The external adjusting mechanism previously referred to may then be manipulated to establish proper idle release clearance between the plates, and clearance gauges may be introduced between the cover and the flywheel and inserted between facing 6 and the flywheel face to ascertain if the plate clearance is correct. The normal plate wear compensating adjustment, however, is made externally of the clutch housing by adjusting the angular position of shaft 21 into proper automatic position, and therefore this adjustment does not in any way affect the adjusted positions of levers 13 and consequently the angular relation of the plates.

It is to be understood that although I have illustrated my novel control mechanism in connection with a particular form of automatic clutch, it is to be understood that it may be successfully utilized in connection with any type of automatic clutch having a member which is adapted to be held in an intermediate or automatic position.

It is also to be understood that although I have illustrated, and prefer to utilize a throwout assembly providing a lost-motion, or one-way connection between the throwout shaft and the latch mechanism, and employ a spring (72) for urging the latch member toward latching position, as it simplifies the design of the clutch adjusting mechanism, it is to be understood that other adjusting means may be used with my latch construction, without departing from the spirit of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. For use in a clutch mechanism having a movably mounted clutch member and actuating means tending to urge said member in one direction; latch means operably associated with said clutch member; means providing a one-way connection between said clutch member and said latch means, and adapted to render said latch means capable of holding said member against the action of said actuating means; and means for causing said latch means to tend to follow said member when the latter is moved against the action of said actuating means.

2. The mechanism described in claim 1, wherein said clutch mechanism is of the character whose said actuating means tends to produce clutch engagement.

3. The mechanism described in claim 1, wherein said last named means comprises resilient means tending to hold the parts of said one-way connection means in force-transmitting condition.

4. The mechanism described in claim 1, wherein said one-way connection means comprises means for adjusting the position of said member with respect to said latch means.

5. In a latch assembly, a movable force transmitting member; a latch device having a latching face; an element adapted to be engaged by said latching face; means, providing a lost motion coupling, for interconnecting said member and said latch device in such manner that when said latching face is engaged with said element, said member will be locked against movement in one direction; and means for causing said latch device to tend to bring its latching face away from said element when said member is moved in the opposite direction.

6. The device set forth in claim 5, wherein said latch device comprises a movably mounted member upon which said latching face is provided.

7. The device described in claim 5, wherein said last named means comprises resilient means which tends to establish a two-way connection between said member and said latch device, so as to insure synchronous movement thereof under normal conditions.

8. The device described in claim 5, together with means for adjusting the position of said member when it is held in locked condition under the influence of said latch device.

9. The device described in claim 5, wherein said interconnecting means is adapted to be manipulated so as to allow movement of said member when it is held in locked condition by said latch device.

10. In a clutch mechanism, in sub-combination, a member adapted to be locked against movement in one direction; a latch element having a latching face and a riding face provided thereon; means interconnecting said member and said latch element; abutment means adapted to cooperate with said latching face and said riding face; and means for causing said latch element to dispose its riding face in engagement with said abutment means when said member is moved in one direction, and for causing said latch element to bring its latching face into engagement with said abutment means when said member is moved in the opposite direction.

11. The device set forth in claim 10, wherein said interconnecting means comprises a pivotal connection, and said last named means comprises resilient means tending to rock said latch element about said pivotal connection as an axis.

12. The device described in claim 10, wherein said abutment means comprises a member having a recess in which said latch element is adapted to be slidably disposed.

13. The device described in claim 10, together with means for lifting said latch element away from said abutment means against the action of said last-named means.

14. The device described in claim 10, wherein said abutment means comprises a member having an aperture therein through which said element is adapted to extend, and whose walls are adapted to limit longitudinal movement thereof in one direction, and transverse movement thereof in either direction.

15. In a clutch, in sub-combination, an element adapted to be selectively locked against movement in one direction; a latch member having a latching face and a riding face and adapted to undergo longitudinal movement; an abutment normally disposed in the path of movement of said latching face; force transmitting means comprising a plurality of engageable parts providing a one-way connection between said latch member and said element and operable to hold the latter in a predetermined position when said latching face is engaged with said abutment, means for moving said latch member so as to bring its latching face out of latching cooperation with said abutment, and resilient means tending to urge the parts of said force transmitting means into engagement at all times to thereby compel synchronous movement of said latch member and said element.

16. The mechanism described in claim 15, wherein said element and said force transmitting means are mounted for rocking movement about a common axis.

17. The mechanism described in claim 15, wherein said force transmitting means comprises means for effecting adjusting movements of said element when said latch member is disposed with its latching face engaged with said abutment.

18. The mechanism described in claim 15, together with an operating device and a second force transmitting means for providing a one way connection between it and said element.

19. In a clutch, in sub-combination, an element adapted to be selectively locked against movement in one direction, a lever mounted for rocking movement, an elongated latch member pivotally connected to said lever and adapted to undergo longitudinal movement in response to rocking movements of the latter, said latch member having a longitudinal riding face and a transversely disposed latching face, an abutment adapted to be engaged by said latching face, means for rocking said lever about its pivotal connection to bring its latching face out of latching cooperation with said abutment, force transmitting means interconnecting said element and said lever, and operable to positively connect them when the latter is rocked in one direction to cause said latch member to move longitudinally and bring its latching face toward said abutment, and means for causing said lever to follow said element when the latter is moved in the opposite direction.

20. The mechanism described in claim 19, wherein said force transmitting means comprises an adjustable screw for predetermining the position of said element when the latter is under the influence of said latch member.

21. The mechanism described in claim 19, wherein said last-named means comprises a spring connected to said lever, and wherein resilient means are also provided for urging said latch member into engagement with said abutment.

ROBERT P. LEWIS.